US006637424B1

United States Patent
Fuhrman et al.

(10) Patent No.: US 6,637,424 B1
(45) Date of Patent: *Oct. 28, 2003

(54) CUTTING APPARATUS AND METHODS OF OPERATION

(75) Inventors: Michael D. Fuhrman, Bothell, WA (US); Dana E. Fuhrman, Bothell, WA (US); Mark J. Suryan, Bothell, WA (US)

(73) Assignee: Carver Saw Co., Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,832

(22) Filed: Nov. 28, 2000

Related U.S. Application Data (63) Continuation-in-part of application No. 09/344,830, filed on Jun. 25, 1999, now Pat. No. 6,152,127.

(51) Int. Cl.[7] ................................................. B28D 7/04
(52) U.S. Cl. ......................... 125/35; 35/13.01; 35/13.03
(58) Field of Search ........................ 125/13.01, 13.03, 125/35

(56) References Cited

U.S. PATENT DOCUMENTS

| 2,455,113 A | 11/1948 | Coates |
| 2,486,386 A | 11/1949 | Bingaman |
| 2,705,005 A | 3/1955 | Tuorto |
| 2,863,441 A | 12/1958 | Harclerode |
| 2,998,813 A | 9/1961 | Wilson |
| 3,621,829 A | 11/1971 | Maluck |
| 3,635,206 A | 1/1972 | Harclerode |
| 3,807,095 A | 4/1974 | Harding et al. |
| 3,815,570 A | 6/1974 | Story |
| 4,315,494 A | * 2/1982 | DiPlacido ................. 125/13.01 |
| 4,428,159 A | 1/1984 | Sigetich et al. |
| 4,940,038 A | 7/1990 | O'Keefe |
| 4,991,354 A | 2/1991 | Schweickhardt |
| 5,282,408 A | 2/1994 | Shiotani et al. |
| 5,394,781 A | 3/1995 | Tsubai |
| 5,482,026 A | 1/1996 | Russell |
| 5,664,612 A | 9/1997 | Klemma |
| 5,746,193 A | 5/1998 | Swan |
| 5,772,496 A | 6/1998 | Kurtz et al. |
| 5,882,155 A | 3/1999 | Testa, Jr. |
| 6,080,041 A | * 6/2000 | Greenland ................ 125/13.01 |
| 6,152,127 A | * 11/2000 | Fuhrman et al. ............... 125/35 |
| 6,272,961 B1 | * 8/2001 | Lee ......................... 125/13.03 |

OTHER PUBLICATIONS

MK Diamond Products, Inc., Tile and Stone Catalog, 1996, p. 13.

* cited by examiner

Primary Examiner—Joseph J. Hail, III
Assistant Examiner—Alvin J. Grant
(74) Attorney, Agent, or Firm—Graybeal Jackson Haley LLP (57) ABSTRACT

Various modifications to a cutting tool such as a tile saw are disclosed. One modification is the frame having a hollow cylindrical receptacle and the tool mounting structure having a cylindrical insert that is disposable within the hollow receptacle to allow one to swivel the tool in and out of position. Another modification is the tool holding bar being rotatable such that one can position the tool without loosening the brackets that attach the tool to the bar. Another modification is positioning the cutting-tray wheels inward of the tray edges to increase the tray's travel distance. Another modification is a retaining mechanism for selectively retaining the tray to the guide rails. This mechanism prevents tray tipping where the wheels-are inward of the tray edges.

27 Claims, 11 Drawing Sheets

CUTTING APPARATUS AND METHODS OF OPERATION

RELATED APPLICATION DATA

The present patent application is a continuation-in-part application of U.S. Ser. No. 09/344,830 now U.S. No. 6,152,127, entitled "Improved Cutting Apparatus and Method For Cutting And Routing," filed Jun. 25, 1999 and issued Nov. 28, 2000.

TECHNICAL FIELD

This invention pertains generally to power tools and more particularly to an improved cutting tool such as a tile saw and methods for adjusting and operating the cutting tool.

BACKGROUND

Portable power saws such as tile saws are frequently used by craftspeople to cut building materials such as tiles and stone into different shapes and sizes for various applications. For example, craftspeople working on construction and remodeling projects often use tile saws to cut tiles and stone for floors, walls, countertops, and fireplaces. Because on-site tile cutting saves time and money as compared with off-site cutting, many tile saws are portable so that craftspeople can use them at the work site.

Figure 1:
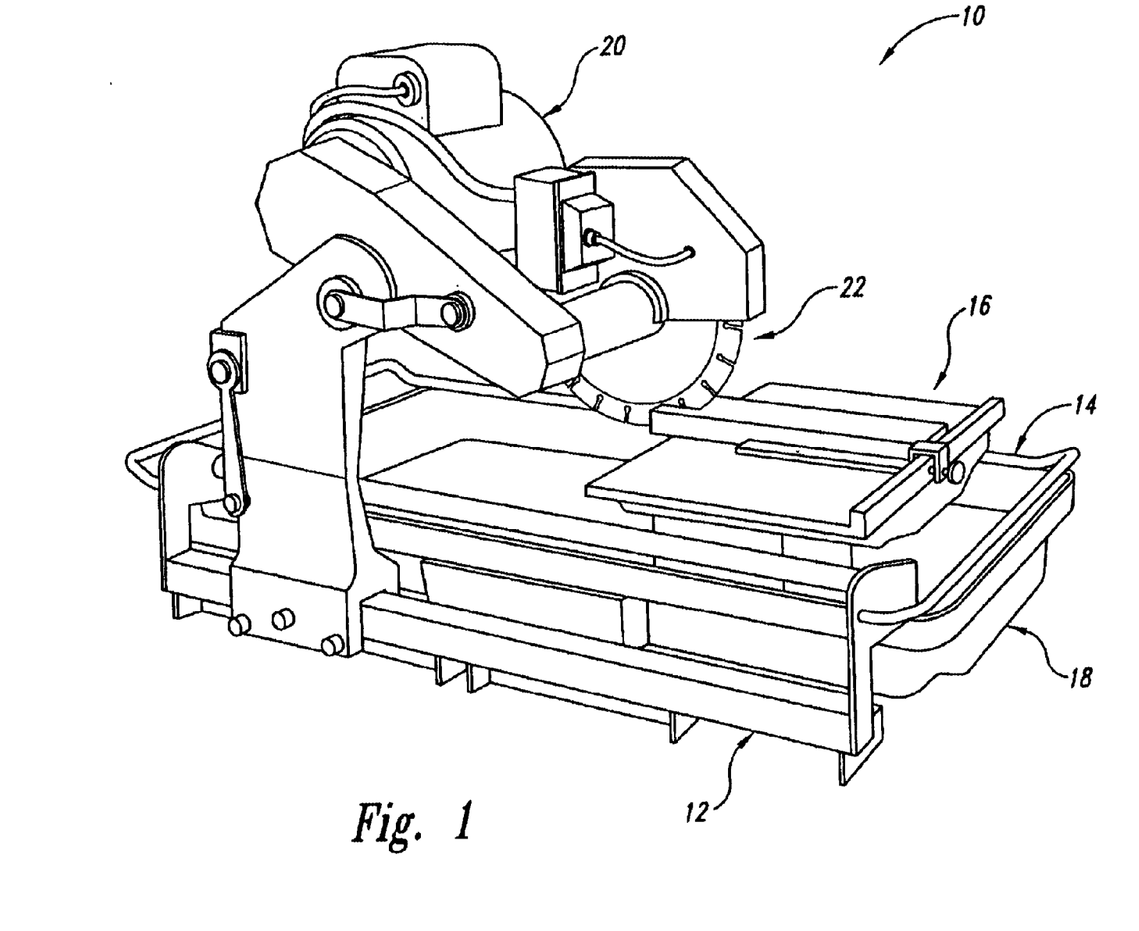
FIG. 1 is a perspective view of a tile saw according to the prior art.

FIG. 1 is a perspective view of a portable tile saw 10, which includes a frame 12, tile-tray guide rails 14, a tile-cutting tray 16, a coolant pan 18, a saw motor 20, and saw blade 22. Because tiles are typically made from ceramic or stone, the saw blade 22 is often diamond tipped. The tile saw 10 is shown cutting a tile 24.

Unfortunately, many portable tile saws are heavy and bulky, and thus are difficult for a lone craftsperson to transport around the work site. For example, a craftsperson often carries his/her portable tile saw up and down stairs. But the tile saw's weight—typically anywhere from 70 to 120 lbs—and structural layout make it difficult to carry even for a relatively strong person. Therefore, many craftspeople seek assistance when carrying their tile saws, particularly when carrying them up and down stairs. But if assistance is unavailable, a craftsperson either waits for assistance to arrive or carries the saw by himself/herself. Unfortunately, waiting for assistance can delay the job and thus cause the craftsperson to lose revenue, and carrying the saw alone can cause the craftsperson to injure himself/herself or to drop and damage the saw.

Referring again to FIG. 1, another problem with many portable tile saws is that the blade coolant leaks onto the floor or other saw-support surface. For example, a pump (not shown in FIG. 1) circulates a coolant such as water from the coolant pan 18 to the saw blade 22, and ideally, the coolant flows back into the pan 18. The pan 18, however, is in a fixed position and is only about as wide as the frame 12. Therefore, if a craftsperson cuts a relatively wide tile, the tile may extend past the edge of the frame 12, and thus past the edge of the pan 18. Consequently, the coolant that dribbles from the blade 22 onto the tile surface may roll off the edge of the tile and onto the floor instead of back into the pan 18.

Still referring to FIG. 1, yet another problem with all portable tile saws is the lack of a routing attachment. Frequently, after cutting the tile 24, a craftsperson smoothens and/or shapes the corners and edges of the tile before installing it. To do this, the craftsperson typically uses a separate routing tool or sends the tile 24 out to a routing facility. Unfortunately, routing tools are relatively expensive, and sending tiles out to a routing facility often delays the completion of the project.

SUMMARY OF THE INVENTION

In one aspect of the invention, an apparatus includes a frame having a hollow cylindrical receptacle, a cutting tool mounting structure having a cylindrical insert that is disposable within the hollow receptacle, a cutting tool that is mountable to the mounting structure, and a material tray slidably mountable to the frame. The cylindrical receptacle and insert allow one to swivel the cutting tool, such as a saw or a router, in and out of position.

In another aspect of the invention, a cutting-tool mounting structure includes a receptacle, a holding bar that is disposable and rotatable within the receptacle and that holds a cutting tool, and a tool-position assembly that retains the holding bar in a desired rotational position with respect to the receptacle. Therefore, instead of loosening brackets and rotating the cutting tool, such as a saw, around the holding bar, one can position the cutting tool by merely rotating the holding bar.

In another aspect of the invention, a material-cutting tray includes a cutting side, an underside, and a wheel assembly mounted to the underside. The cutting side has a length in a cutting direction and first and second ends perpendicular to the cutting direction. The wheel assembly includes four wheels each rotatable in the cutting direction and each positioned $\frac{1}{8}$–$\frac{1}{3}$ of the length of the cutting side from the respective closest one of the first and second ends. By positioning the wheels inward of the ends, the tray has more travel distance along a guide rail. Thus, for material, such as a tile, of a given size, one can use a frame having a shorter length as compared to tile saws having trays with wheels at the tray ends.

In another aspect of the invention, a material-cutting tray includes a cutting side, an underside, and a wheel assembly mounted to the underside. The wheel assembly includes tray-support wheels each rotatable in a cutting direction and for respectively engaging the upper sides of a pair of guide rails, and includes a retain-release mechanism for retaining the tray to one or both of the rails. Therefore, where the wheels are mounted inward of the tray ends and a material, such as a tile, unbalances the tray, such a mechanism prevents the tray from tipping.

DETAILED DESCRIPTION OF THE INVENTION

Figure 2:
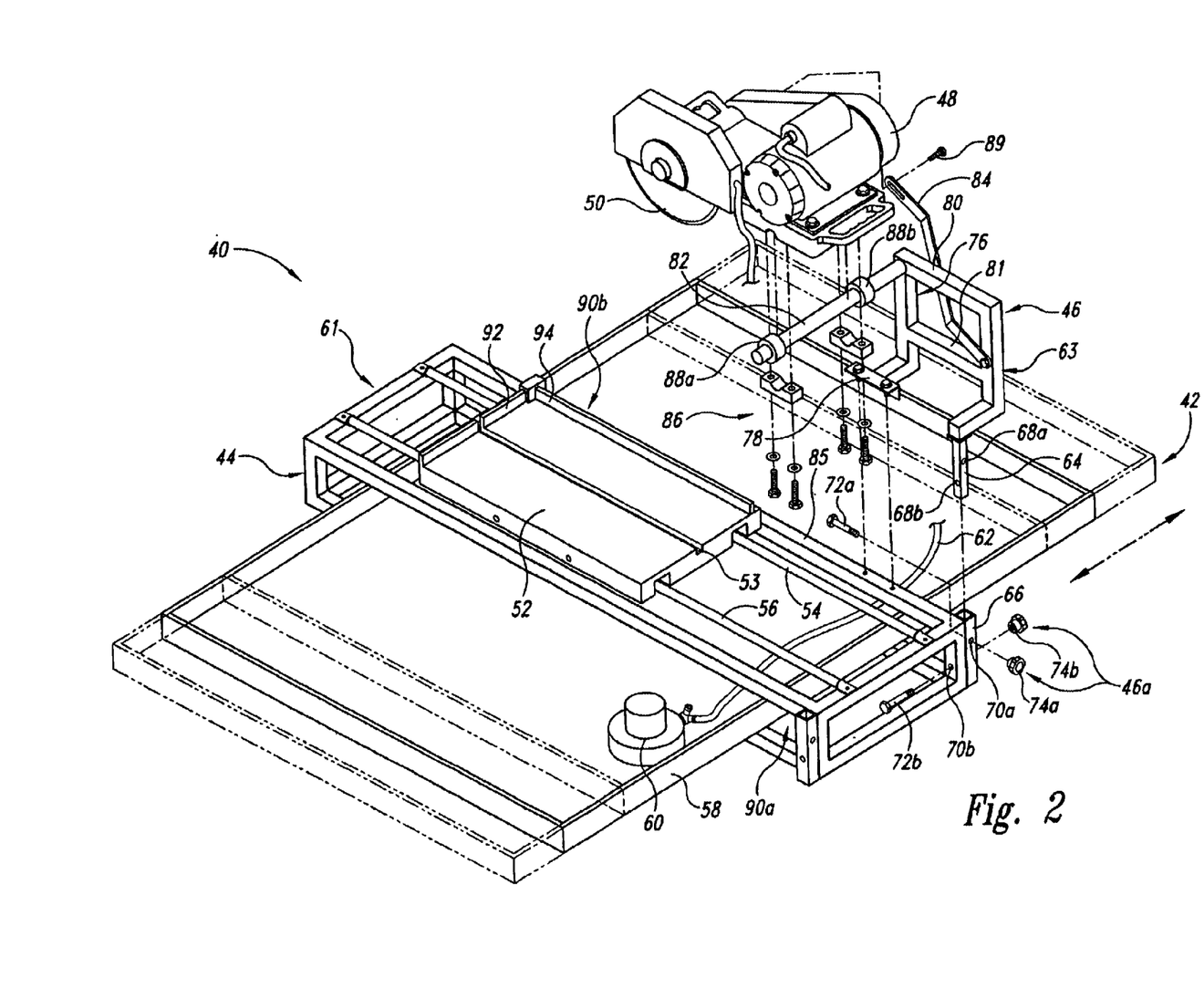
FIG. 2 is a perspective view of a tile saw having a removable saw-mounting structure according to an embodiment of the invention.

FIG. 2 is a perspective view of a tile saw 40 having a saw-frame assembly 42, which includes a frame 44 and a removable saw-motor mounting structure 46 according to an embodiment of the invention. The tile saw 40 also includes a saw motor 48 mounted to the structure 46, a saw blade 50, a cutting tray 52 having a cutting channel 53, cutting-tray guide rails 54 and 56, a coolant pan 58, a coolant pump 60, and a coolant hose 62.

The removable saw-motor mounting structure 46 allows for easier carrying of the saw 40 as compared to prior saws. For example, a craftsperson (not shown) can remove the structure 46 and the attached motor 48 from the frame 44. Typically, the motor 48 has a handle 59, and the tubular construction of the frame 44 makes it easy for the craftsperson to grasp. Therefore, the craftsperson can put the cutting tray 52 inside the coolant tray 58, carry the motor 48 and attached support 46 in one hand, and carry an end 61 of the frame 44 in the other hand such that the coolant pan 58 and its contents do not fall away from the frame. Or, to reduce the weight being carried at any one time, the craftsperson can carry the motor 48 and the attached structure 46 to the destination, and then come back for the frame 44, the coolant pan 58, the cutting tray 52, and the other elements of the saw 40.

Still referring to FIG. 2, in one embodiment the saw-motor mounting structure 46 includes a first support member 63 and an insert 64, which is attached to the support member 63 and which mates with a receptacle 66 of the frame 44. In one embodiment, the receptacle 66 is a hollow aluminum tube having a rectangular cross section. The insert 64 and receptacle 66 include aligned holes 68a and 68b and 70a and 70b, respectively, and fasteners such as bolts 72a and 72b are disposed within these holes to secure the structure 46 to the frame 44. The holes 68a, 68b, 70a, and 70b may be threaded, or fastening nuts such as thumb screws 74a and 74b may hold the bolts 72a and 72b in place. The thumb screws 74a and 74b promote quick hand attachment and removal of the structure 46 to and from the frame 44.

The structure 46 also includes a second support member 76, a mount 78 attached to the member 76, cross-support members 80 and 81, a saw-holding bar 82, and a saw-stabilization bracket 84 according to an embodiment of the invention. To promote quick hand attachment and removal of the structure 46 to and from the frame 44, the mount 78 may be attachable to a cross element 85 of the frame 44 with bolts and thumb screws (not shown) that are similar to the bolts 72a and 72b and thumb screws 74a and 74b. The bar 82 is a cylindrically shaped solid-steel rod, and the saw motor 48 is attached thereto with a conventional bracket-and-bolt mounting assembly 86, which allows the craftsperson to adjust the height of the saw blade 50 by rotating the motor 48 about the bar 82. Donut washers 88a and 88b prevent side-to-side movement of the motor 48 so that the saw blade 50 stays aligned with a cutting channel 53. The washers 88a and 88b may be welded to the bar 82 or may be secured to the bar with set screws (not shown). The set screws are useful where the cutting tray 52 has multiple cutting channels 53 (only one shown in FIG. 2) because it allows the craftsperson to align the saw blade 50 with the desired channel. Furthermore, unlike prior tile saws, the craftsperson can adjust the position of the saw motor 48 along the bar 82 while the saw-motor mounting structure 46 is unattached to the frame 44. In such an embodiment, the bar 82 may have an alignment mark (not shown) that the craftsman can use to align the blade 50 to the cutting channel 53 while the support 46 is not attached to the frame 44. The bracket 84 provides added support to the motor 48. One end of the bracket 84 attaches to the support member 63, and the other end attaches to the motor 48 with a fastener 89 and is slotted to allow the motor 48 to be rotated about the bar 82.

In one embodiment, the components of the saw-motor mounting structure 46 have the following dimensions (outside dimensions are given where applicable). The support members 63 and 76 are L shaped, have horizontal sections that are approximately 5" long, vertical sections that are approximately 6.75" high, and have 1.5"×1.5" cross sections. The insert 64 is approximately 6.75" high and has a 1.125"×1.125" cross section. The mount 78 is made from 0.25"-thick steel and is approximately 6.25" long, 1.75" wide, and 1.75" deep. The cross-support members 80 and 81 are approximately 8.75" long, and member 80 has a 1.5"× 1.5" cross section. The bar 82 is approximately 16.5" long and has a diameter of approximately 0.25" diameter.

Still referring to FIG. 2, the coolant pan 58 is better able to catch dripping coolant than conventional coolant pans. The pan 58 holds a coolant such as water, which the pump 60 pumps through the hose 62 to cool the saw blade 50, and recovers the coolant that drips from the tile (FIG. 1) being cut. In one embodiment, the coolant pan 58 is disposed and can slide within a slot formed by side openings 90a and 90b of the frame 44. Thus, the craftsman can adjust the position of the pan 58 so that it can catch coolant dripping from both wide and narrow tiles. The pan 58 is also wider than conventional coolant pans, and this further increases the pan's positional range.

Still referring to FIG. 2, additional features of the tile saw 40 are discussed. In one embodiment, the frame 44 is rectangular and is formed from welded aluminum tubes having rectangular or square cross sections. A large version of the frame 44 is approximately 39" long by 20" wide by 6¾" high. When including this large frame, the tile saw 40 allows a craftsman to cut tiles having widths up to approximately 24". However, the tile saw 40 can include frames 44 of different sizes. In another embodiment, the coolant pan 58 is 40" wide, and thus is wider than the length of the frame 44. Therefore, the frame 44 fits inside the coolant pan 58 along with the other parts of the saw 40—e.g., the mounting support 46, motor 48, and blade 50—for convenient storage. In still another embodiment, conventional positioning rails 92 and 94 are attached to the cutting tray 52 to hold a tile in place while being cut. In yet another embodiment, the cutting tray 52 has multiple cutting channels 53.

Still referring to FIG. 2, in operation, the craftsperson attaches the saw blade 50 to the motor 48, attaches the motor 48 to the saw-motor mounting structure 46, and attaches the structure 46 to the frame 44. He/she then measures a tile (FIG. 1) and marks where the cut is to be made. Next, the craftsperson places the tile on the cutting tray 52 and adjusts the positioning guides 92 and 94 so that the cut mark is aligned with the saw blade 50. He/she then positions the cooling pan 58 so that it is under both side edges of the tile. This insures that the pan 58 will catch coolant dripping from either side of the tile. Next, the craftsperson starts the motor 48, pushes the tray 52, and thus the tile, toward and into the blade 50, and continues pushing until the tile is cut. He/she then turns off the motor 48.

Figure 3:
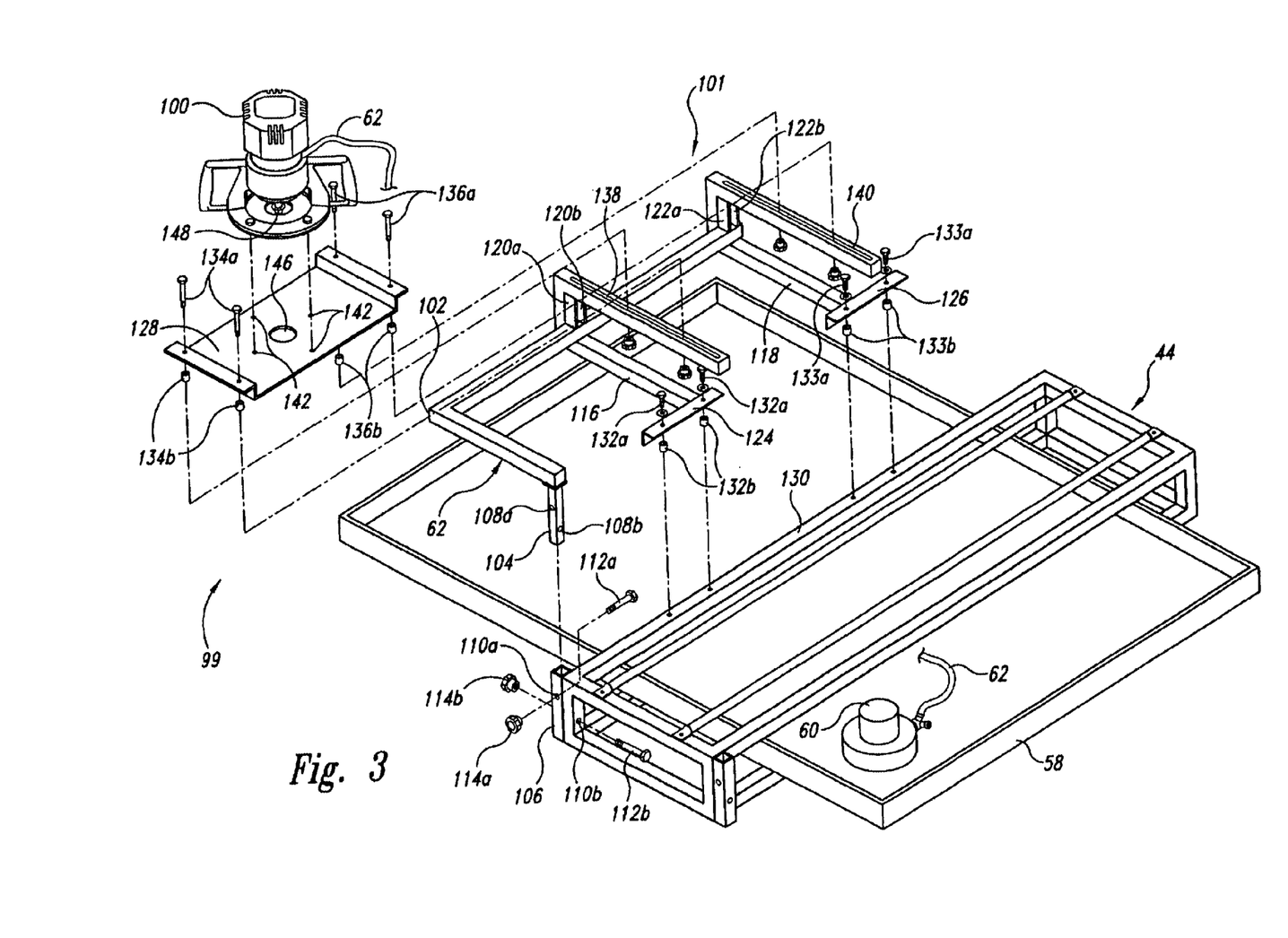
FIG. 3 is a perspective view of the tile-saw frame and coolant pan of FIG. 2 and a removable routing assembly according to an embodiment of the invention.

FIG. 3 is a perspective view of the frame 44 and the coolant pan 58 of the tile saw 40 of FIG. 2, and a removable router assembly 99 according to an embodiment of the invention. The assembly 99 includes a conventional router 100 and a router mounting structure 101, which allows a craftsperson to route the edge of a cut tile using the tile saw 40. Furthermore, because the saw-motor mounting and router mounting structures 46 (FIG. 2) and 101 are relatively easy to attach to and remove from the frame 44, the craftsperson can easily switch back and forth between tile cutting and tile routing. This saves the craftsman time and money as compared with using a separate routing tool or sending the tile out to be routed.

In one embodiment, the router mounting structure 101 includes a cross-support member 102 and an insert 104, which is attached to the member 102 and which mates with a receptacle 106 of the frame 44. The insert 104 and receptacle 106 may be similar to the insert 64 and receptacle 66 of FIG. 2, and include aligned holes 108a and 108b and 110a and 110b, respectively. Fasteners such as bolts 112a and 112b are disposed within these holes to secure the structure 101 to the frame 44. The holes 108a, 108b, 110a, and 110b may be threaded, or fastening nuts such as thumb screws 114a and 114b may hold the bolts 112a and 112b in place. The thumb screws 114a and 114b promote quick hand attachment and removal of the structure 101 to and from the frame 44.

In one embodiment, the router mounting structure 101 also includes first and second support members 116 and 118, corner support brackets 120a and 120b and 122a and 122b, mounts 124 and 126, and a router mounting plate 128. To promote quick hand attachment and removal of the structure 101 to and from the frame 44, the mounts 122 and 124 are attachable to a cross element 130 of the frame 44 with bolts and thumb screws 132a and 132b and 133a and 133b. In addition, the plate 128 is attachable to the support members 116 and 118 with bolts and thumb screws 134a and 134b and 136a and 136b. Furthermore, to allow lateral movement and positioning of the plate 128, the members 116 and 118 include respective bolt slots 138 and 140. The plate 128 includes router mounting holes 142, which receive bolts (not shown) for mounting the router 100 to the plate 128. These bolts may be secured with thumb screws (not shown) to promote quick hand attachment and removal of the router 100 from the plate 128. The plate 128 also includes a bit opening 146 through which a router bit 148 extends. The router 100 or the structure 101 may include a mechanism (not shown) that allows the craftsperson to adjust the distance that the bit 148 extends through the opening 146.

In one embodiment, the components of the router mounting structure 101 have the following dimensions (outside dimensions are given where applicable). The cross-support member 102 is approximately 11.5" wide by 26.25" long. The insert 104 is approximately 6.75" high and has a cross section of approximately 1.125×"1.125". The support members 116 and 118 are approximately 6.75" high, 12.75" wide along the bottom portions, and 15.625" wide along the slotted top portions. The slots 138 and 140 are approximately 11.625" long by 0.625" wide. The support member 116 is approximately 9.75" from the insert 104, and the support member 118 is approximately 12" from the member 116. The mounts 124 and 126 are made from 0.25"-thick steel and are approximately 6.25" long, 1.75" wide, and 1.75" deep. The supports 120a, 120b, 122a, 122b are each made from 0.125"-thick steel and are approximately 2.25" high by 1.5" wide. The plate 128 is formed from 0.25"-thick steel, is approximately 14.94" long by 8" wide, has vertical flange sections that are approximately 1.75" high, and has horizontal flange sections that are approximately 1.75" wide.

Still referring to FIG. 3, in operation, the craftsperson attaches the router 100 to the plate 128, attaches the plate 128 to the router mounting structure 101, and attaches the structure 101 to the frame 44. He/she then adjusts the router bit 148 to the desired depth. Next, the craftsperson places a tile (FIG. 1) on the cutting tray 52 (FIG. 2) and adjusts the positioning guides 92 and 94 (FIG. 2) so that the edge of the tile to be routed is in the desired position with respect to the router bit 148. He/she then positions the cooling pan 58 so that it is under both side edges of the tile. This insures that the pan 58 will catch coolant dripping from either side of the tile. Next, the craftsperson starts the router 100, pushes the tray 52, and thus the tile, and continues pushing until the tile edge is shaped by the bit 148. He/she then turns off the router 100.

In operation, when the craftsperson wishes to cut a tile and then route an edge of the tile, he first attaches the saw-motor mounting structure 46 to the frame 44 as described above in conjunction with FIG. 2. He/she then cuts the tile as described above. Next, the craftsperson attaches the router mounting structure 101 to the frame 44. If he/she would like more room to work, then he/she can remove the saw-mounting structure 46 before routing the tile. Then, the craftsperson routes an edge of the tile as described above.

Figure 4:
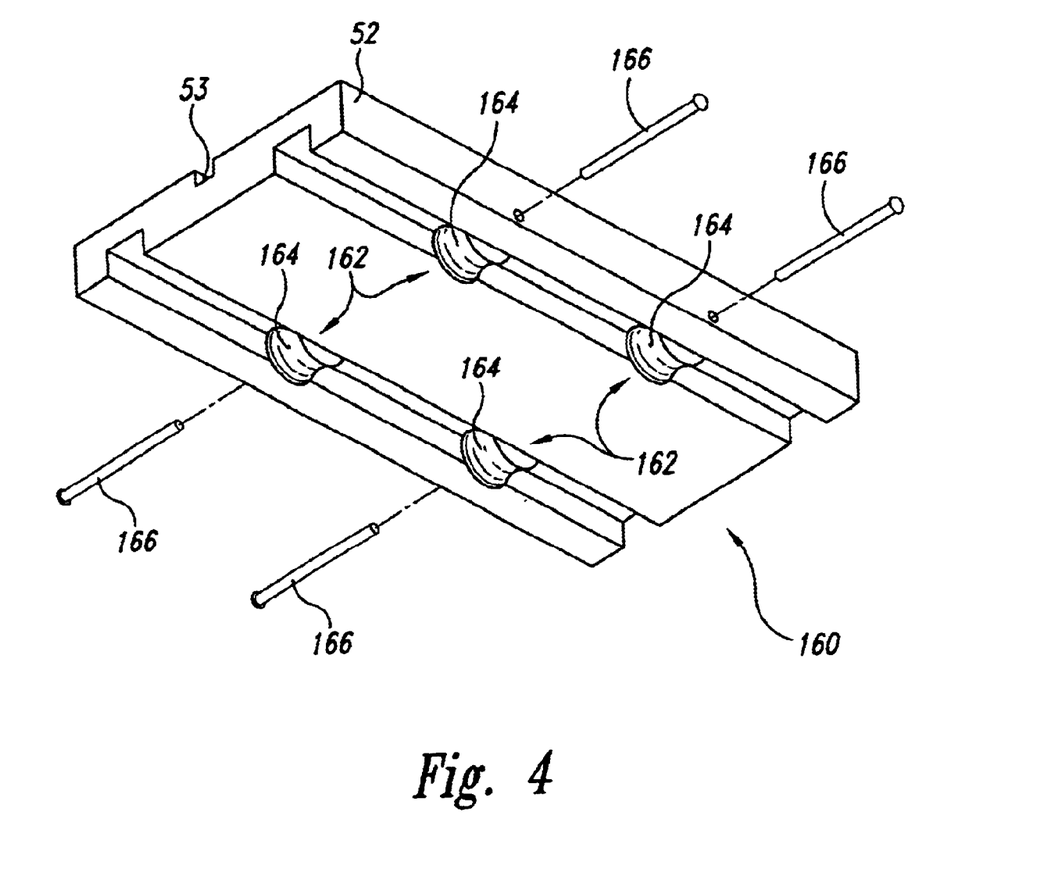
FIG. 4 is a perspective view of the underside of the tile tray of FIG. 2 and the tile-tray wheel assembly according to an embodiment of the invention.

FIG. 4 is a perspective view of the underside of the cutting tray 52 of FIG. 2 and a tray wheel assembly 160 according to an embodiment of the invention. The assembly 160 includes four wheels 162, which have respective U grooves 164 and respective center bearings (not shown). Axles 166 extend through the respective bearings and secure the wheels 162 to the tray 52. The grooves 164 have semicircular cross sections with approximately the same radii as the respective tray guide rails 54 and 56 (FIG. 2). The shape of the grooves 164 and the relatively close fit between the grooves 164 and the guide rails 54 and 56 ensure that the wheels 162 will roll smoothly even if small particles of dust or other debris adhere to the guide rails. Consequently, there will be few, if any, jitter-induced nicks in the tile being cut or routed. The shapes of the grooves 164 allows the wheels 162 to provide a lateral counterforce and lateral stability sufficient to oppose the lateral force imparted to the tile by the router bit 148 during the routing of the tile.

Figure 5:
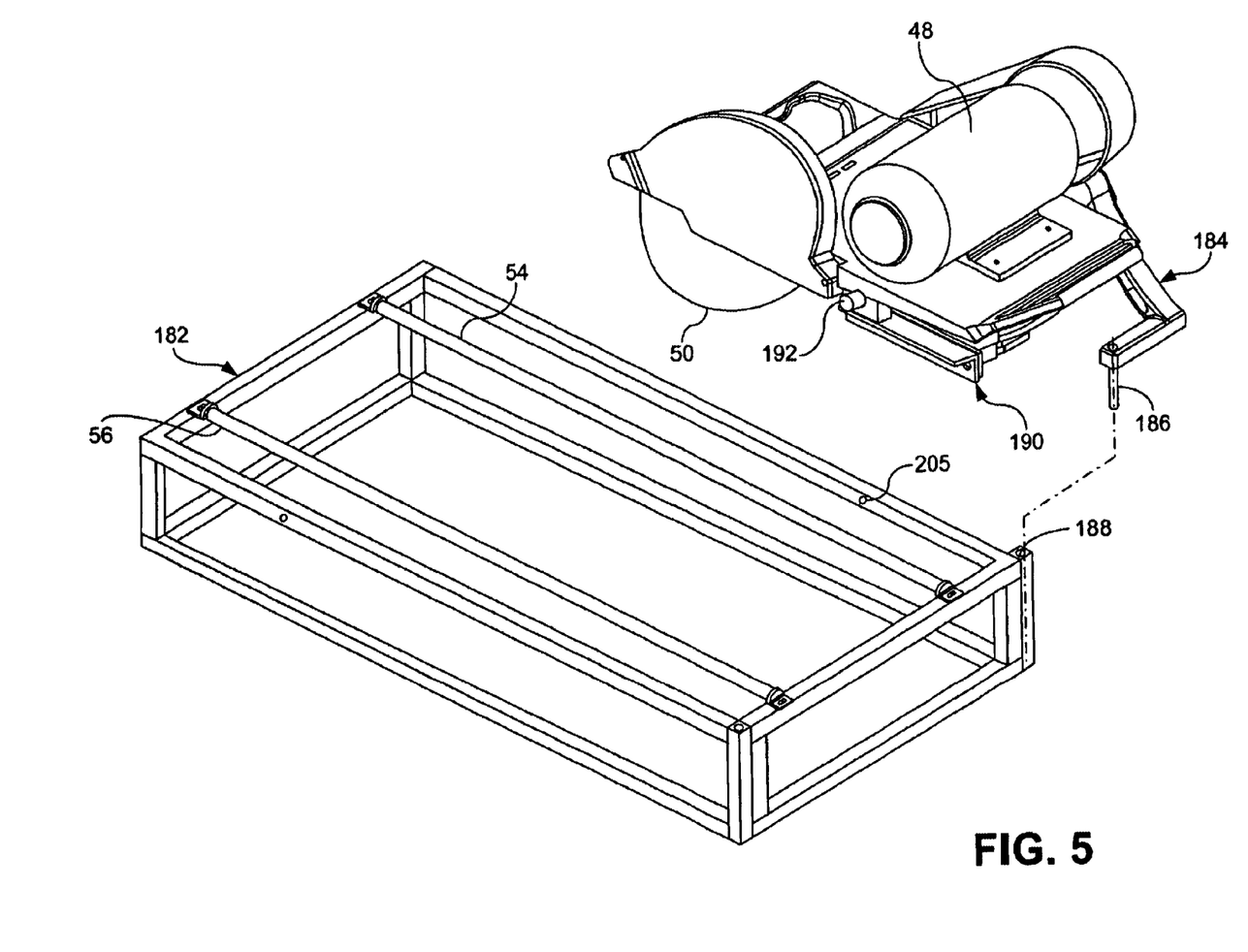
FIG. 5 is a perspective view of a tile saw having a removable and swivelable saw-mounting structure according to an embodiment of the invention.

FIG. 5 is a perspective view of a tile saw 180 having a frame 182 and a removable and swivelable saw-mounting structure 184 according to an embodiment of the invention, where like numerals are used to refer to like elements with respect to the tile saw 40 of FIG. 2. For clarity, the cutting tray 52, the coolant pan 58, and other elements are omitted from FIG. 5.

In addition to allowing for easier carrying of the tile saw 40, the saw-mounting structure 184 allows one to swivel the saw 40 with respect to the frame 182, allows one to lock the structure in a range of swivel positions, and allows one to more easily rotate the saw 40 in an up or down direction.

More specifically, the saw-mounting structure 184 includes a cylindrical insert 186, and the frame 182 includes a hollow cylindrical receptacle 188 for receiving the insert 186. Because the insert 186 and receptacle 188 are cylindrical, the insert 186 can rotate within the receptacle 188. Consequently, the saw-mounting structure 184—and thus the saw motor 48 and blade 50—can swivel with respect to the frame 182. This allows one to swivel the motor 48 to the side of the frame 182, and thus out of the way, without removing the motor 48 and the saw-motor mounting structure 184 from the frame 182.

The saw-mounting structure 184 also includes an adjustable bracket 190, which allows one to lock the structure 184—and thus the motor 48 and blade 50—in a range of swivel positions. This allows one a greater ability to align the blade 50 with the tray cutting channel 53 (FIG. 2). For example, if one drops the motor 48, frame 182, or saw-mounting structure 184, and this dropping knocks the blade 50 out of alignment, one can often realign the blade 50 by readjusting the bracket 190. With an unadjustable bracket, such a misalignment may be uncorrectable and thus render the saw 40 unusable. The bracket 190 is further discussed below in conjunction with FIGS. 7–8.

Figure 6:
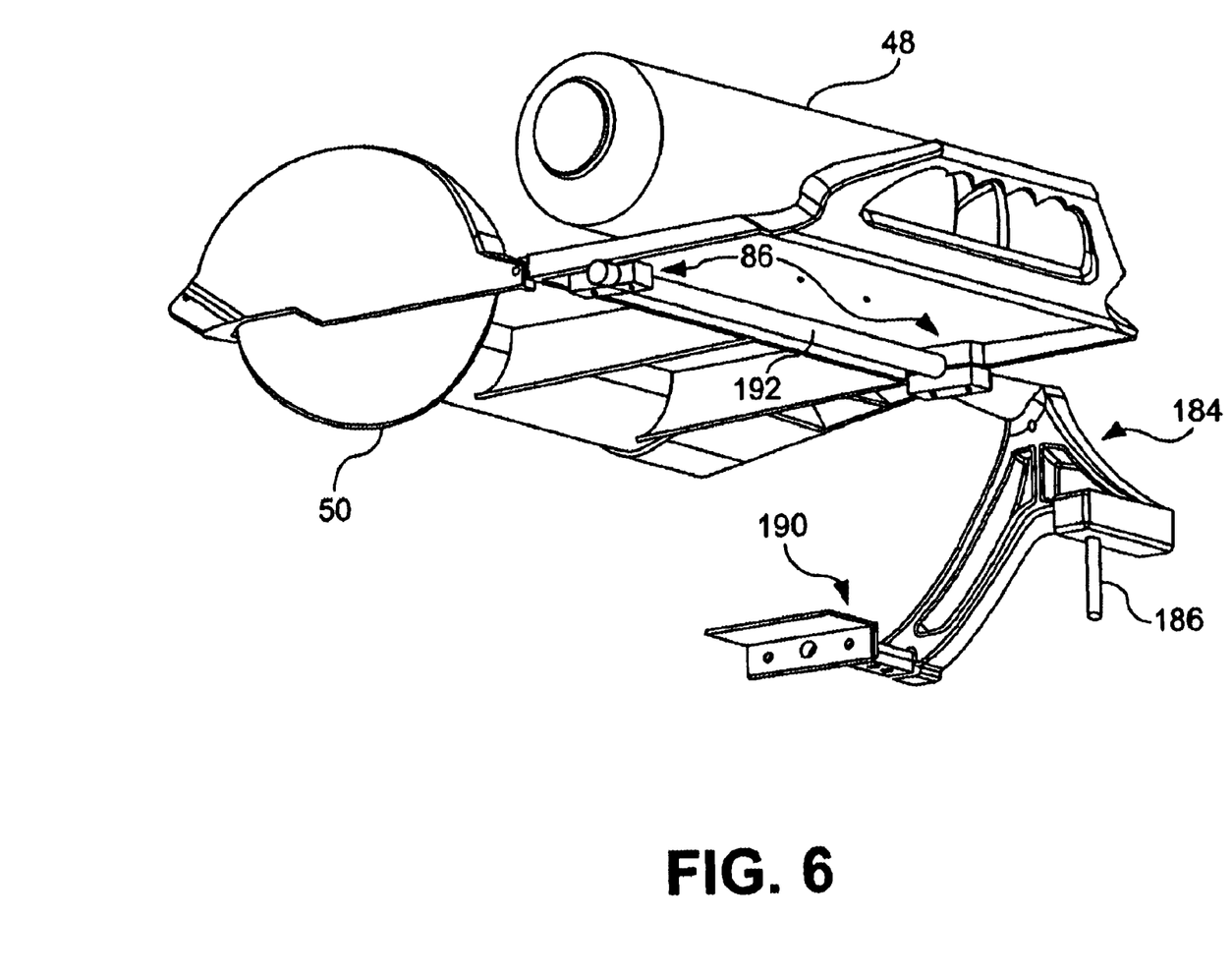
FIG. 6 is a perspective view of the saw motor and saw-motor mounting structure of FIG. 5 according to an embodiment of the invention.

The saw-mounting structure further includes a rotatable holding bar 192, which allows one to adjust the height of the saw blade 50 without loosening the bracket-and-bolt mounting assembly 86 (FIGS. 2 and 6).

FIG. 6 is a perspective view of the underside of the saw motor 48 and the saw-motor mounting structure 184 of FIG. 5 according to an embodiment of the invention.

Figure 7:
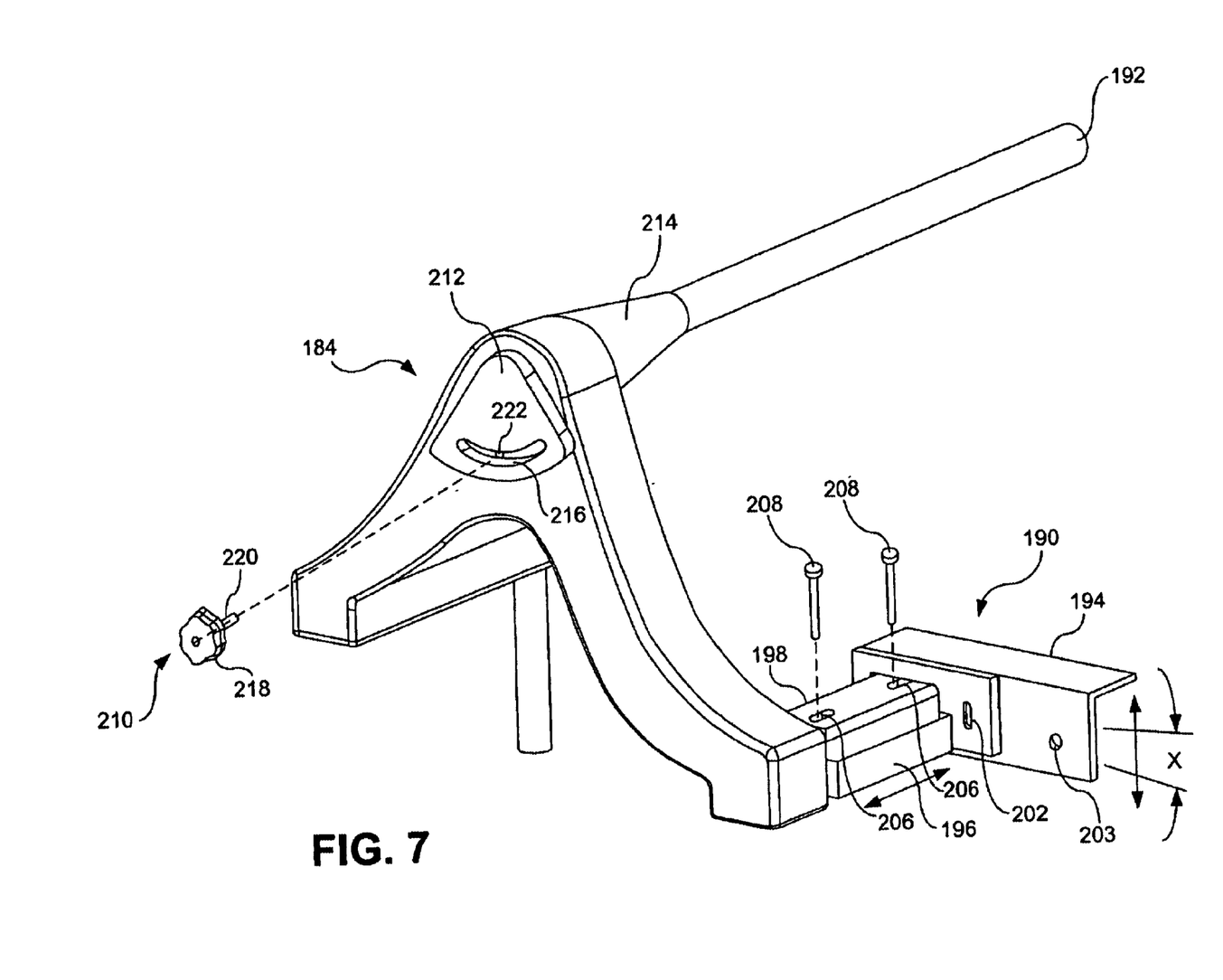
FIG. 7 is a partially exploded view of the saw-motor mounting structure of FIGS. 5 and 6 according to an embodiment of the invention.
Figure 8:
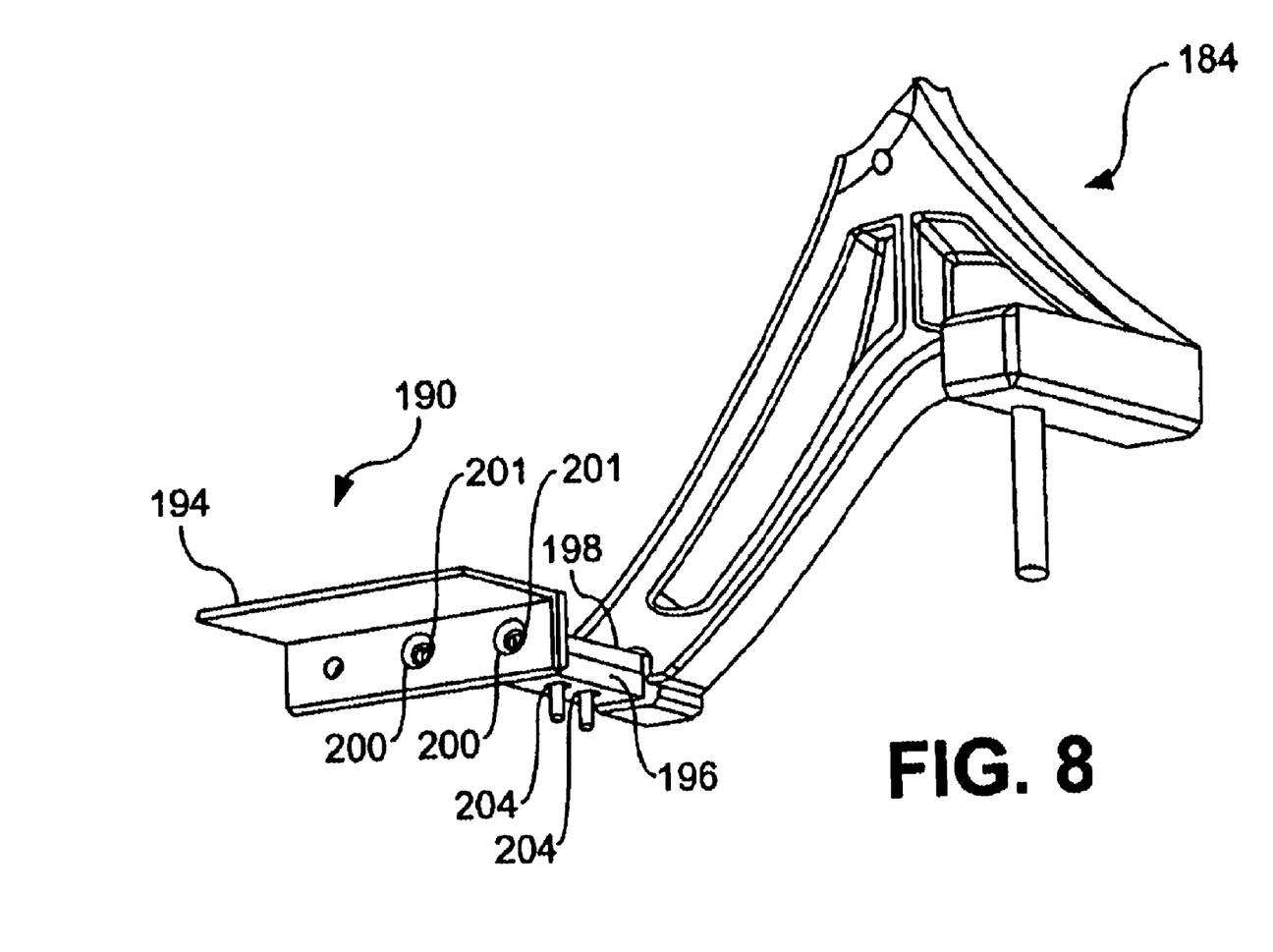
FIG. 8 is a perspective view of the saw-motor mounting structure of FIGS. 5–7 according to an embodiment of the invention.

FIGS. 7–8 are partially exploded views of the saw-motor mounting structure 184 of FIGS. 5–6 according to an embodiment of the invention.

Referring to FIGS. 7–8, the bracket 190 includes an L-shaped member 194 for engaging the frame 182 (FIG. 5), a support member 196 to which the member 194 is attached, and an extension arm 198 to which the support member 196 is attached.

The member 194 includes one or more countersunk holes 200 for receiving respective fasteners 201, such as bolts or screws, that attach the member 194 to the support member 196, and includes one or more holes 203 for receiving fasteners (not shown) that attach the bracket 190 to the frame 182 via one or more frame holes 205 (FIG. 5). The holes 203 or 205 may be vertically or horizontally elongated to accommodate different adjustments of the bracket 190.

The member 196 includes elongated holes 202 for respectively receiving the fasteners 201. Because the holes 202 are elongated, they allow one to adjust the height of the member 194 with respect to the member 196. The member 196 also includes holes 204, which are elongated in a direction parallel to the L-shaped member 194, and the arm 198 includes holes 206, which are elongated in a direction perpendicular to the L-shaped member 194. Fasteners 208 fasten the member 196 to the arm 198. Because the holes 204 and 206 are elongated in perpendicular directions, one can adjust the angle x of the member 196, and thus of the L-shaped member 194, with respect to the arm 198. Thus, one can lock the swivel position of the saw-motor mounting structure 184, and thus the angle of the saw blade 50 (FIGS. 5–6), with the member 194 evenly abutting, i.e., being flush with, the cross member of the frame 182 (FIGS. 5–6).

Referring to FIG. 7, the saw-motor mounting structure 184 also includes a saw-motor position assembly 210, which allows one to adjust the height of the saw blade 50 (FIGS. 5–6) according to an embodiment of the invention. The assembly 210 includes a plate 212 that is attached to the end of the holding bar 192, which is free to rotate within a receptacle 214. The receptacle 214 may or may not include a bearing. The plate has a slot 216, which is concentric with the bar 192. The assembly 210 also includes a thumb knob 218 having a threaded shaft 220, which engages a threaded hole 222 in the mounting structure 184. One can adjust the height of the blade 50 by loosening the knob 218, rotating the bar 192 until the blade 50 is at the desired height, and tightening the knob 218 to lock the blade 50 at the desired height.

Figure 9:
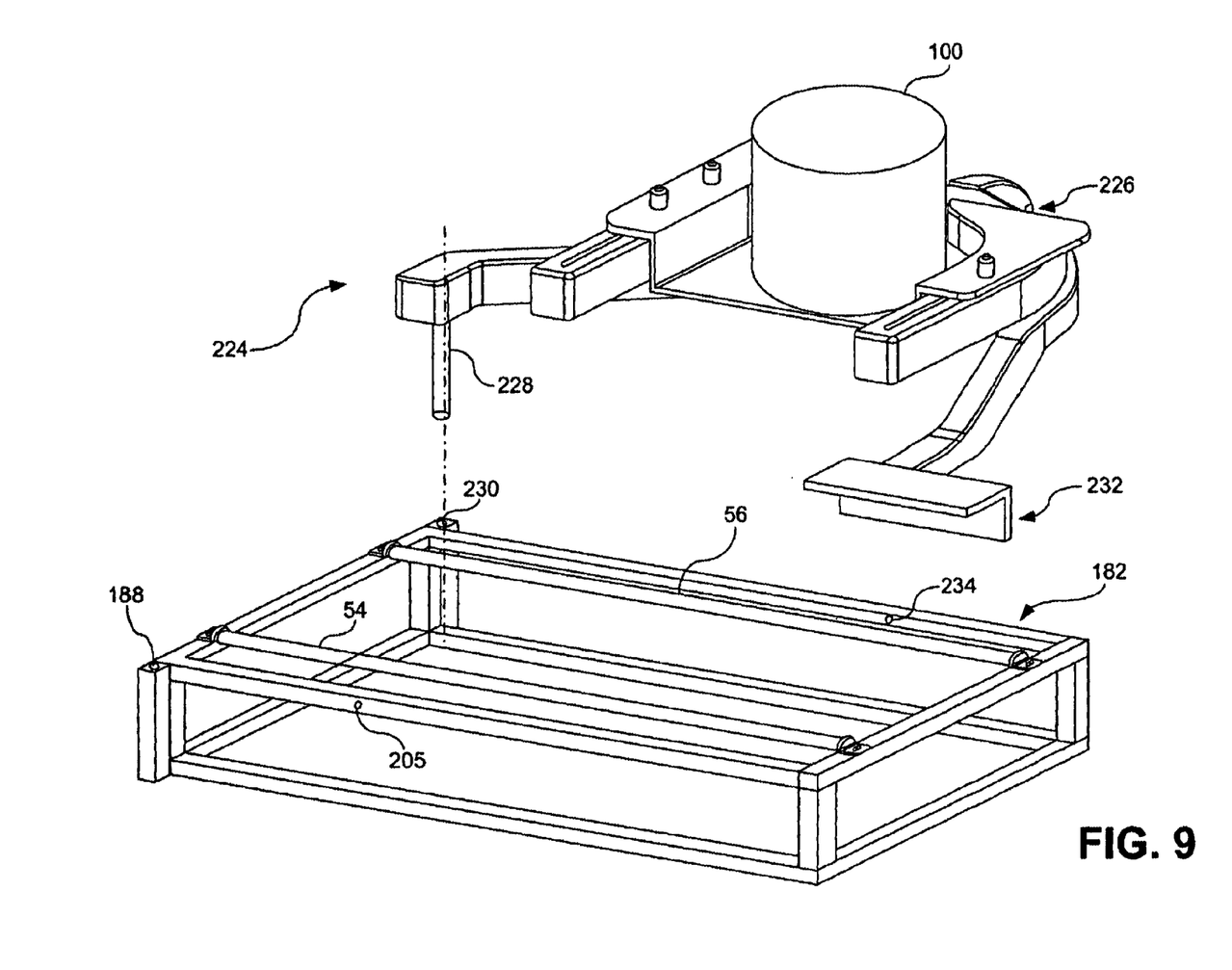
FIG. 9 is a perspective view of the tile-saw frame of FIG. 5 and a removable and swivelable router assembly according to an embodiment of the invention.

FIG. 9 is a perspective view of the frame 182 of FIG. 5 and a removable and swivelable router assembly 224 according to an embodiment of the invention, where like numerals are used to refer to like elements with respect to the router assembly 99 of FIG. 3. For clarity, the cutting tray 52, the coolant pan 58, the router bit 148, and other elements are omitted from FIG. 9.

The router assembly 224 includes the router 100 and a router mounting structure 226, which allows one to swivel the router 100 with respect to the frame 182. More specifically, the router mounting structure 226 includes a cylindrical insert 228, and the frame 182 includes a hollow cylindrical receptacle 230 for receiving the insert 228. Because the insert 228 and the receptacle 230 are cylindrical, the insert 228 can rotate within the receptacle 230. Consequently, the router mounting structure 226—and thus the router 100—can swivel with respect to the frame 182. This allows one to swivel the motor router 100 to the side of the frame 182, and thus out of the way, without removing the router 100 and the router mounting structure 226 from the frame 182. An adjustable bracket 232 allows one to lock the router mounting structure to the frame 182 with a fastener (not shown) via one or more frame holes 234. The bracket 232 is further discussed below in conjunction with FIG. 10.

Figure 10:
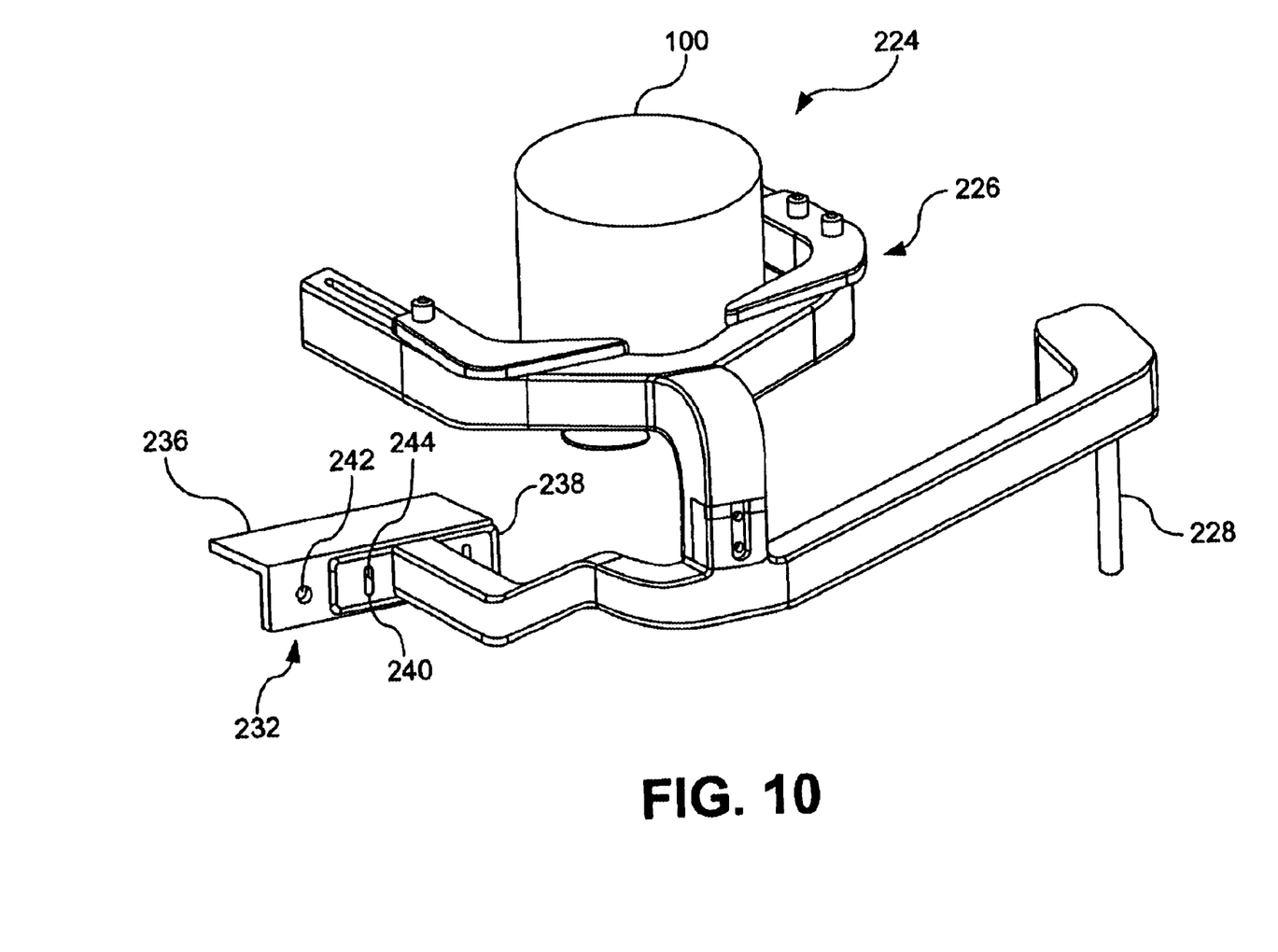
FIG. 10 is a perspective view of the router assembly of FIG. 9 according to an embodiment of the invention.

FIG. 10 is a perspective view of the rear side the router assembly 224 of FIG. 9 according to an embodiment of the invention. The bracket 232 includes an L-shaped member 236 for engaging the frame 182 (FIG. 9) and includes a support member 238 to which the member 236 is attached. The member 236 includes one or more countersunk holes 240 for receiving respective fasteners (not shown) that attach the member 236 to the support member 238, and includes one or more holes 242 for receiving fasteners (not shown) that attach the bracket 232 to the frame 182 via the one or more frame holes 234 (FIG. 9). The holes 234 or 242 may be vertically or horizontally elongated to accommodate different adjustments of the bracket 232.

The support member 238 includes elongated holes 244 for respectively receiving the fasteners that extend through the holes 240 of the member 236. Because the holes 244 are elongated, they allow one to adjust the height of the member 236 with respect to the member 238, and thus to square up the router assembly 224 with the frame 182.

Referring to FIGS. 9–10, in another embodiment the bracket 232 is similar to the bracket 190 of FIGS. 5–8.

Figure 11:
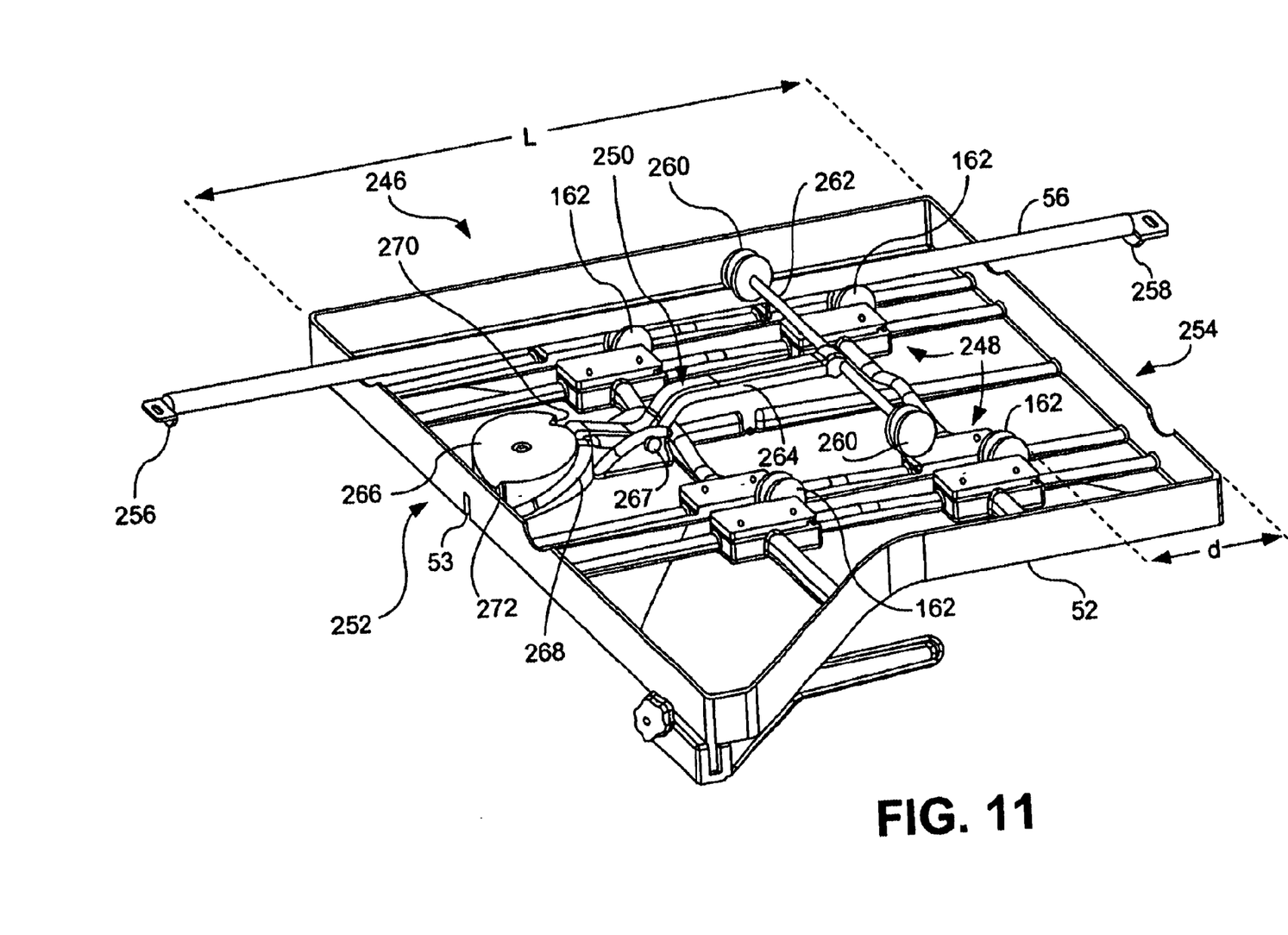
FIG. 11 is a perspective view of the underside of the tile tray of FIG. 2 and tile-tray wheel and retain-release assemblies according to an embodiment of the invention.

FIG. 11 is a perspective view of an undercarriage 246 the tile tray 52 according to an embodiment of the invention, where like numerals refer to like elements with respect to FIGS. 2 and 4. The undercarriage 246 includes a wheel assembly 248 and a retaining mechanism 250 for locking the tray 52 to the guide rails 54 and 56 (only guide rail 56 shown in FIG. 11 for clarity).

The wheel assembly 248 includes the U-grooved wheels 162, which are discussed above in conjunction with FIG. 4. The wheels 162 are mounted inward of ends 252 and 254 of the tray 52. In one embodiment where the tray has a length L, each wheel 162 is mounted approximately ⅛L–⅓L from the end 252 or 254 closest to the wheel. Because end rail end tabs 256 and 258 prevent the wheels 162 from traveling past the ends of the rails 54 and 56, mounting the wheels inward of the ends 252 and 254 increases the travel-distance range of the tray 52 as compared to a tray with wheels mounted at the tray ends. For example, if all the wheels 162 are mounted the same distance d from the closest tray edge (d is measured from the portion of the wheel 162 closest to the tray edge), then the travel-distance range is increased by approximately d in each travel direction for a total increase of 2d as compared to a tray with end-mounted wheels. That is, if the wheels 162 are mounted at the tray ends 252 and 254, then the tray ends cannot travel beyond the tabs 256 and 258, respectively. But with the wheels 162 mounted a distance d from the tray ends 252 and 254, the tray ends 252 and 254 can each travel a distance d beyond the tabs 256 and 258, respectively. Consequently, mounting the wheels 162 inward of the tray ends 252 and 254 provides an increase in the tray travel distance without requiring an increase in the length of the frame 182 (FIGS. 5 and 9).

The retaining mechanism 250 includes retaining wheels 260, an axle 262, a member 264, and a retain-release knob 266. The wheels 260, which are mounted to the axle 262, are similar to the wheels 162 and respectively engage the bottoms of the rails 54 and 56 when the mechanism 250 is in a retain position. Although two wheels 260 are shown, the mechanism 250 may have fewer or more than two 25 wheels 260. The member 264, which pivots at a pivot point 267, supports the axle 262 and forces the wheels 260 to engage the rails 54 and 56 when the knob 266 is in a retain position. The knob 266 has a sloped edge 268 and stops 270 and 272. As the knob rotates clockwise, the portion of the edge 268 that engages the member 264 becomes thicker. This forces the wheels 162 and 260 against opposite sides of the rails 54 and 56, and thus locks the tray 52 to the rails 54 and 56. Such locking of the tray prevents a material that overhangs the edges 252 or 254 from tipping the tray, and also prevents the tray from accidentally falling off the rails 54 and 56. As the knob rotates counterclockwise, the portion of the edge 268 that engages the member 264 becomes thinner, thus unlocking the tray 52 from the rails 54 and 56.

Still referring to FIG. 11, the procedure for installing the tray 52 on and removing the tray 52 from the rails 54 and 56 is discussed according to an embodiment of the invention. One first turns the knob 266 counterclockwise to release the retaining wheels 260. As one turns the tray 52 so that the underside faces downward (if the underside does not already face downward), the released wheels 260 fall away from the wheels 162, thus increasing the spread between the wheels 162 and 260. One tilts the tray 52 as necessary to place the wheels 260 beneath rails 54 and 56, and then installs the tray 52 onto the frame 182 (FIGS. 5, 6, and 8) such that the wheels 162 respectively engage the upper surfaces of the rails 54 and 56. Next, one turns the knob 266 clockwise to respectively engage the retaining wheels 260 with the bottom surfaces of the rails 54 and 56, thus locking the tray 52 to the rails 54 and 56. To remove the tray 52 from the rails 54 and 56, one turns the knob 266 counterclockwise to release the retaining wheels 260, and then tilts the tray 52 as necessary to remove wheels from under the rails 54 and 56.

From the foregoing it will be appreciated that, although specific embodiments of the invention have been described herein for purposes of illustration, various modifications may be made without deviating from the spirit and scope of the invention.

What is claimed is:

1. An apparatus, comprising:
a frame having a hollow cylindrical receptacle;
a material-cutting tray mountable to the frame, the mounted tray slideable in a direction;
a saw-motor mounting structure having a cylindrical insert that is disposable within the hollow receptacle to allow swiveling of the saw-motor mounting structure about an axis that is not parallel to the direction; and
a saw motor that is mountable to the saw-motor mounting structure.

2. The apparatus of claim 1, further comprising;
a saw blade that is mountable to the saw motor, the mounted saw blade defining a cutting angle with respect to the material-cutting tray; and
wherein the saw-motor mounting structure has a bracket that is attachable to the frame and that allows adjustment of the cutting angle.

3. The apparatus of claim 1 wherein:
the frame includes a member having a top that faces the saw motor when the saw motor is mounted to the saw-motor mounting structure; and
the saw-motor mounting structure includes a bracket that is attachable to the member, the bracket having a top that abuts the top of the member when the bracket is attached to the member, the bracket being adjustable to allow the top of the bracket to evenly abut the top of the member.

4. The apparatus of claim 1 wherein:
the frame includes a member having a side; and
the saw-motor mounting structure includes a bracket that is attachable to the member, the bracket having a side that abuts the side of the member when the bracket is attached to the member, the bracket being adjustable to allow the side of the bracket to evenly abut the side of the member.

5. The apparatus of claim 1 wherein:
the frame includes a member having an outer side; and
the saw-motor mounting structure includes a bracket that is attachable to the member, the bracket having a side that abuts the side of the member when the bracket is attached to the member, the bracket being adjustable to allow the side of the bracket to evenly abut the outer side of the member.

6. An apparatus, comprising:
a frame having a hollow cylindrical receptacle;
a material-routing tray mountable to the frame, the mounted tray moveable in a direction;
a router-motor mounting structure having a cylindrical insert that is disposable within the hollow receptacle to allow swiveling of the router-motor mounting structure about an axis that is not parallel to the direction; and
a router motor that is mountable to the router-motor mounting structure.

7. The apparatus of claim 6 wherein:
the frame includes a member having a top that faces the router motor when the router motor is mounted to the router-motor mounting structure; and
the router-motor mounting structure includes a bracket that is attachable to the member, the bracket having a top that abuts the top of the member when the bracket is attached to the member, the bracket being adjustable to allow the top of the bracket to evenly abut the top of the member.

8. A material-cutting tray, comprising:
a cutting side operable to hold a material to be cut, the cutting side having a length in a cutting direction and first and second ends perpendicular to the cutting direction;

an underside; and a wheel assembly mounted to the underside and comprising four wheels each rotatable in the cutting direction and each positioned a respective nonzero distance from a closest one of the first and second ends.

9. The material-cutting tray of claim 8 wherein the respective distances are the same.

10. A material-cutting tray, comprising:

a cutting side operable to hold a material to be cut;

an underside; and a wheel assembly mounted to the underside and comprising, tray-support wheels each rotatable in a cutting direction and operable to respectively engage first sides of guide rails, and a first retaining wheel operable to retain a first one of the tray-support wheels to a first one of the guide rails by engaging a second side of the first guide rail.

11. The material-cutting tray of claim 10 wherein the wheel assembly further comprises:

a member coupled to the first retaining wheel; and a knob that engages the member, the knob operable to cause the first retaining wheel to engage the second side of the first guide rail by rotating in a direction, the knob operable to allow the first retaining wheel to disengage the second side of the first guide rail by rotating in an opposite direction.

12. The material-cutting tray of claim 10 wherein the retaining mechanism comprises:

a second retaining wheel operable to retain a second one of the tray-support wheels to a second one of the guide rails by engaging a second side of the second guide rail;

member coupled to the first and second retaining wheels; and a knob that engages the member, the knob operable to cause the first and second retaining wheels to respectively engage the second sides of the first and second guide rails by rotating in a direction, the knob operable to allow the first and second retaining wheels to respectively disengage the second sides of the first and second guide rails by rotating in an opposite direction.

13. A cutting apparatus, comprising:

a frame having a saw-mounting portion and a router-mounting portion that is separate from the saw-mounting portion, the saw-mounting portion having a hollow cylindrical saw receptacle and the router-mounting portion having a hollow cylindrical router receptacle;

a saw mounting structure having a cylindrical saw insert that is disposable within the saw receptacle;

a saw that is mountable to the saw mounting structure;

a router mounting structure having a cylindrical router insert that is disposable within the router receptacle;

a router that is mountable to the router mounting structure; and a material-cutting tray mounted to the frame and moveable in a cutting direction.

14. The apparatus of claim 13 wherein:

the cylindrical saw insert allows swiveling of the saw with respect to the frame; and the cylindrical router insert allows swiveling of the router with respect to the frame.

15. A method, comprising:

swiveling a saw-motor mounting structure within a frame about an axis that is not parallel to a cutting direction to align a saw blade with the cutting direction; and retaining the saw-motor mounting structure in the alignment position.

16. A method, comprising:

swiveling a router-motor mounting structure within a frame about an axis that is not parallel to a direction in which a material tray can move to position a router with respect to the frame; and retaining the router-motor mounting structure in the position.

17. A method, comprising:

placing a material-cutting tray on a guide rail; and securing the tray to the guide rail without using a tool.

18. The method of claim 17, further comprising removing the tray from the guide rail.

19. The method of claim 17 wherein:

placing the material-tray on the guide rail comprises engaging a tray-support wheel with a first side of the guide rail; and securing the tray comprises engaging a locking wheel against a second opposite side of the guide rail to force the tray-support wheel against the first side of the guide rail.

20. The apparatus of claim 1, further comprising;

wherein the mounted tray is slidable in a cutting direction;

a saw blade that is mountable to the saw motor, the mounted saw blade defining a cutting angle with respect to the cutting direction; and wherein the cutting angle is adjustable by swiveling-the saw-motor mounting structure about the axis.

21. The apparatus of claim 1, further comprising;

a saw blade that is mountable to the saw motor; and wherein the blade can be squared by swiveling the saw-motor mounting structure about the axis.

22. The apparatus of claim 1 wherein the axis is perpendicular to the direction.

23. The apparatus of claim 6 further comprising;

a router bit that is mountable to the router motor, the mounted router bit having a position with respect to the material-cutting tray; and wherein the position of the router bit is adjustable by swiveling the router-motor mounting structure about the axis.

24. The apparatus of claim 6 wherein the axis is perpendicular to the direction.

25. The material-cutting tray of claim 10 wherein the first retaining wheel is operable to allow the tray to be removed from the guide rails by disengaging the second side of the first guide rail.

26. A material-cutting tray, comprising:

a cutting side operable to hold a material to be cut;

an underside; and a hand-operable retaining mechanism mounted to the underside and operable to secure the material-cutting tray to a guide rail and to allow removal of the tray from the guide rail.

27. The material-cutting tray of claim 26 wherein the hand-operable retaining mechanism comprises:

a retaining wheel;

a member coupled to the first retaining wheel; and a knob operable to urge the member toward the underside of the material-cutting tray and to urge the retaining wheel against the guide rail when the knob is rotated in a first direction, the knob operable to release the member and the retaining wheel when the knob is rotated in a second direction.

* * * * *

UNITED STATES PATENT AND TRADEMARK OFFICE
CERTIFICATE OF CORRECTION

PATENT NO. : 6,637,424 B1
DATED : October 28, 2003
INVENTOR(S) : Michael D. Fuhrman, Dana E. Fuhrman and Mark J. Suryan It is certified that error appears in the above-identified patent and that said Letters Patent is hereby corrected as shown below:

Column 11,
Line 33, before "member", please insert -- a --.

Column 12,
Line 28, please delete the hyphen (-) in between the words "swiveling" and "the".

Signed and Sealed this

Twenty-second Day of June, 2004

JON W. DUDAS
*Acting Director of the United States Patent and Trademark Office*